United States Patent

[11] 3,627,809

[72] Inventor Robert J. Thomas
 Midland, Mich.
[21] Appl. No. 819,119
[22] Filed Apr. 24, 1969
[45] Patented Dec. 14, 1971
[73] Assignee The Dow Chemical Company
 Midland, Mich.

[54] 2-METHYLENE-3-BUTENYL ISOCYANATE AND PREPARATION THEREOF
 4 Claims, No Drawings
[52] U.S. Cl. .................................................. 260/453 AL,
 260/453 P, 260/583 H, 260/859
[51] Int. Cl. .......................................................... C07c119/04
[50] Field of Search ............................................ 260/453
 AL, 453 P

[56] References Cited
UNITED STATES PATENTS
3,242,140 3/1966 Hoover......................... 260/453 X
OTHER REFERENCES
 Tanimoto et al.: Chemical Abstracts, Vol. 66, p. 279 (1967).

Primary Examiner—Charles B. Parker
Assistant Examiner—Dolph H. Turrence
Attorneys—Griswold & Burdick and C. E. Rehberg ABSTRACT: 2-Methylene-3-butenyl isocyanate is prepared by the reaction of a quaternary ammonium cyanate with 2-chloromethyl-1,3-butadiene or the reaction of phosgene with 2-aminomethyl-1,3-butadiene. As a butadiene it is copolymerizable with butadiene, acrylonitrile and other olefinic monomers to produce polymers having pendant NCO groups and useful as adhesives. As an isocyanate it is reactive with active hydrogen compounds to produce urethanes, ureas, etc.

2-METHYLENE-3-BUTENYL ISOCYANATE AND PREPARATION THEREOF

BACKGROUND OF THE INVENTION

According to U.S. Pat. No. 2,866,801, organic halides, such as butyl chloride or allyl chloride, can be converted into the corresponding isocyanates by reaction with an alkali or alkaline earth metal cyanate in certain critical solvents. All attempts to use these salts in the present invention have failed.

SUMMARY OF THE INVENTION

The novel compound 2-methylene-3-butenyl isocyanate is made by (1) reacting a quaternary ammonium cyanate with 2-chloromethyl-1,3-butadiene or (2) reacting phosgene with 2-aminomethyl-1,3-butadiene. No solvent is required for the first process. The compound is a colorless liquid having great chemical reactivity. Being a substituted butadiene, it polymerizes and copolymerizes with other olefinic monomers in a manner similar to that of butadiene. The resulting polymers have pendant isocyanate groups which make them useful in making polyurethanes and polyureas. The presence of the isocyanate groups makes these polymers especially effective as adhesives, particularly when applied to materials, such as wood and cellulose, having OH groups or other sources of active hydrogen, since the isocyanate groups react readily with such active hydrogen. Likewise, being an isocyanate, the compound of the invention is useful as a chemical intermediate for introducing the butadienyl radical into other compounds, since it is reactive with active hydrogen compounds, such as alcohols, amines and phenols. By reaction with water it is converted into the known compound, 2-aminomethyl-1,3-butadiene.

SPECIFIC EMBODIMENTS OF THE INVENTION

Example 1. Reaction of 2-Chloromethyl-1,3-butadiene with Tetra(n-Butyl)Ammonium Cyanate.

A stirred reactor containing 19.2 g. of 2-chloromethyl-1,3-butadiene was heated to 90° C., 9.9 g. of tetra (n-butyl)ammonium cyanate was added and stirring at 90° was continued for 15 min. The reaction mixture was then flash distilled at 90° C. under vacuum and the distillate was fractionated by preparative vapor-phase chromatography, thus producing 0.9 g. (24 percent yield, based on cyanate) of 2-methylene-3-butenyl isocyanate. There was recovered 14.5 g. of chloromethylbutadiene (96 percent of the unreacted material). The identity of the product was confirmed by NMR, IR and mass spectroscopy.

Example 2. Reaction of Phosgene with 2-Aminomethyl-1,3-butadiene.

A solution of 4.2 g. of 2-aminomethyl-1,3-butadiene and 8 g. of pyridine in 75 ml. of pentane was added dropwise to 75 ml. of pentane which was kept saturated with phosgene. The pentane solution was then separated, washed with 0.1 N NaHSO$_4$ and then with water. After being dried, the solution was vacuum flashed and the distillate fractionated to produce 1.8 g. (34 percent yield) of 2-methylene-3-butenyl isocyanate.

The same product is obtained when the quaternary cyanate used in example 1 is replaced with other quaternary ammonium cyanates. The preferred quaternaries are the tetraalkylammonium salts wherein the alkyls are lower alkyls of one to eight carbon atoms each, or the corresponding salts wherein one alkyl is replaced with benzyl. Thus, suitable salts include the tetramethyl-, tetraethyl-, tetrabutyl-, tetraoctyl-, benzyltrimethyl-, benzyltriethyl- and benzyltrihexylammonium cyanates.

The compound of the invention is polymerized or copolymerized with other vinyl monomers by use of conventional techniques, initiators, etc. as are other substituted butadienes, such as chloroprene, except that, if the isocyanate group is to be preserved, the polymerization must be carried out in the absence of water, alcohol and other active-hydrogen compounds reactive with isocyanates.

I claim:
1. 2-Methylene-3-butenyl isocyanate.
2. The process of making the compound of claim 1 wherein 2-chloromethyl-1,3-butadiene is reacted by contact with a tetra (lower alkyl)ammonium or benzyltri (lower alkyl)ammonium cyanate.
3. The process of claim 2 wherein the cyanate is a tetra (lower alkyl)ammonium cyanate.
4. The process of claim 2 wherein the cyanate is a benzyltri(lower alkyl)ammonium alkyl cyanate.

* * * * *